(12) United States Patent
Du et al.

(10) Patent No.: US 7,689,980 B2
(45) Date of Patent: Mar. 30, 2010

(54) SPLITTING THE COMPUTATION SPACE TO OPTIMIZE PARALLEL CODE

(75) Inventors: Zhao Hui Du, Shanghai (CN); Shih-wei Liao, San Jose, CA (US); Gansha Wu, Beijing (CN); Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1216 days.

(21) Appl. No.: 11/241,396

(22) Filed: Sep. 30, 2005

(65) Prior Publication Data

US 2007/0079300 A1 Apr. 5, 2007

(51) Int. Cl.
G06F 9/45 (2006.01)
(52) U.S. Cl. .................. 717/160; 717/140; 717/149; 717/150; 717/151; 717/159; 717/161
(58) Field of Classification Search .................. 717/149
See application file for complete search history.

(56) References Cited

U.S. PATENT DOCUMENTS 6,507,947 B1 * 1/2003 Schreiber et al. ............ 717/160
7,487,497 B2 * 2/2009 Ren et al. ................... 717/150

OTHER PUBLICATIONS

Lim et al. "An affine Partitioning Algorithm to Maximize Parallelism and Minimize Communication", 1999.*

Ancourt, Corinne et al., "Scanning Polyhedra with DO Loops," in: *3rd ACM SIGPLAN Symposium on Principles and Practice of Parallel Programming*, Jun. 1991, pp. 1-12.

Lim, Amy W. et al., "Maximizing Parallelism and Minimizing Synchronization with Affine Transforms," in: *Conference Record of the 24th Annual ACM Symposium on Principles of Programming Languages*, 1997, pp. 1-14.

Hall, Mary W. et al., "Maximizing Multiprocessor Performance with the SUIF Compiler," *Digital Technical Journal*, vol. 10, No. 1, 1998, pp. 71-80.

Lim, Amy W. et al., "Maximizing Parallelism and Minimizing Synchronization with Affine Partitions," *Parallel Computing*, vol. 24, 1998, pp. 445-475.

Lim, Amy W. et al., "Blocking and Array Contraction Across Arbitrarily Nested Loops Using Affine Partitioning," in: *Proceedings of the 8th ACM SIGPLAN Symposium on Principles and Practice of Parallel Programming*, Jun. 2001.

* cited by examiner

*Primary Examiner*—Lewis A Bullock, Jr.
*Assistant Examiner*—Mark A Gooray
(74) *Attorney, Agent, or Firm*—Blakely, Sokoloff, Taylor & Zafman LLP

(57) ABSTRACT

Linear transformations of statements in code are performed to generate linear expressions associated with the statements. Parallel code is generated using the linear expressions. Generating the parallel code includes splitting the computation-space of the statements into intervals and generating parallel code for the intervals.

14 Claims, 11 Drawing Sheets

```
for J = 1 to n
    for K = 1 to n
        A[J, K] = B[J, K]     (S1)
        C[J, K] = A[K, J]     (S2)
```

WHERE n = 2

$\Phi_1(J,K) = J$     (AE1)

$\Phi_2(J,K) = K$     (AE2)

```
for P = 1 to n
    for J = 1 to n
        for K = 1 to J
            if (P == J)              (E3)
                A[P, K] = B[P, K]    (S3)
            if (P == K)              (E4)
                C[J, P] = A[P, J]    (S4)
```

FIG. 4

501 — case J < P
```
for J = 1 to P-1
    for K = 1 to J
        if (P == K)
            C[J, P] = A[P, J]    (S4)
```

502 — case J == P
```
J=P
for K = 1 to J
    if (P == J)
        A[P, K] = B[P, K]    (S3)
    if (P == K)
        C[J, P] = A[P, J]    (S4)
```

503 — case J > P
```
for J = P+1 to n
    for K = 1 to J
        if (P == K)
            C[J, P] = A[P, J]    (S4)
```

FIG. 5

```
For I = 1 to L
  For J1 = 1 to M
    S1;
    S2;
  End For J1
  For J2 = 1 to N
    S3;
  End For J2
End For I
```
⤴ 802

P=I+2*J1   for S1
P=I+1      for S2
P=-I+1     for S3

```
For I = 1 to L
  For J1 = 1 to M
    S1;
    S2;
  End For J1
  For J2 = 1 to N
    S3;
  End For J2
End For I
```
⤴ 702

P=I+2*J1   for S1
P=I+1      for S2
P=I-J2     for S3

For P //different P runs in different processor (or core)
    For I= 1 to L but I!=T(S2) and I!=T(S3)
For J1 = 1 to M
    S1;
End For J1
End For I
End For P

FIG. 9

For P //different P runs in different processor (or core)
    I=T(S2)
For J1 = 1 to M
    S1;
    S2;
End For J1
End For P

FIG. 10

```
For(Ix=start_I;Ix<T1;Ix++){
  //The original loop body of the loop Ix after removing all statements in S
}
Ix=T1;
//The original loop body of the loop Ix after removing all statements in S - {s1}

For(Ix=T1+1;Ix<T2;Ix++){
  //The original loop body of the loop Ix after removing statements in S
}
Ix=T2;
//The original loop body of the loop Ix after removing statements in S - {s2}
....

For(Ix=Tp+1;Ix<end_I;Ix++){
  //The original loop body of the loop Ix after removing statements in S
}
```

FIG. 10B

```
StartIndex=loop_start_index;
For(i=0;i<p;i++){
   EndIndex=Ti
   For(Ix=StartIndex;Ix<EndIndex;Ix++) call C(p+1);
  Ix=EndIndex; call C(Ti);
   StartIndex=EndIndex+1;
}
For(Ix=StartIndex;Ix<loop_end_index;Ix++) call C(h+1);
```

FIG. 10C

For each statement S ⤶ 1102
  For each loop level J for S ⤶ 1104
    If S is degenerate with respect to the loop level J ⤶ 1106
    Then
      Solve the expression guarding S for J and assign the solution to J' ⤶ 1108
      Replace the degenerate loop J with J' ⤶ 1110
      Add the guard on J' to honor the bounds of degenerate loop J ⤶ 1112
      Break
  End For
End For

DEGENERATIVE LOOP REMOVAL

FIG. 11

1201
case J < P
    for J = 1 to P-1
        if $(1 \leq P \leq J)$
            C[J, P] = A[P, J]

1202
case J == P
    for K = 1 to P
        if (P == P)
            A[P, K] = B[P, K]
        if (P == K)
            C[P, P] = A[P, P]

1203
case J > P
    for J = P+1 to n
        if $(1 \leq P \leq J)$
            C[J, P] = A[P, J]

FIG. 12

```
for P = 1 to n
  for K = 1 to P
    if (P == P)
      A[P, K] = B[P, K]
    if (P == K)
      C[P, P] = A[P, P]
    for J = P+1 to n
      if (1 ≤ P ≤ J)
        C[J, P] = A[P, J]
```

FIG. 13

```
for P = 1 to n
  for K = 1 to P
    A[P, K] = B[P, K]
    if (P == K)
      C[P, P] = A[P, P]
    for J = P+1 to n
      C[J, P] = A[P, J]
```

FIG. 14

SPLITTING THE COMPUTATION SPACE TO OPTIMIZE PARALLEL CODE

CROSS-REFERENCE TO RELATED APPLICATIONS

This application is related to commonly-assigned applications "Generating Efficient Parallel Code using Partitioning, Coalescing, and Degenerative Loop and Guard Removal", U.S. patent application Ser. No. 11/239,818, filed Sep. 30, 2005, and "Methods and Apparatuses for Affine-Partitioning Programs unto Multi-cores/SMPS with Optimized Accesses", U.S. patent application Ser. No. 11,241,260.

TECHNICAL FIELD

Embodiments of the invention relate to the field of compilers and more specifically, but not exclusively, to splitting the computation space to optimize parallel code.

BACKGROUND

Multiprocessors, which herein include multi-core processors, are becoming more widespread in the computer industry. As such, to optimize performance on multiprocessors, software programs need to be parallelized to take full advantage of parallel execution. Programs may be written using sequential programming and then compiled with a parallelizing compiler to produce the parallel code. Parallelizing compilers locate computations in the sequential code that can execute independently in parallel.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 shows code in accordance with an embodiment of the present invention.

FIG. 5 shows code in accordance with an embodiment of the present invention.

FIG. 7 shows code in accordance with an embodiment of the present invention.

FIG. 8 shows code in accordance with an embodiment of the present invention.

FIG. 9 shows code in accordance with an embodiment of the present invention.

FIG. 10 shows code in accordance with an embodiment of the present invention.

FIG. 10B shows code in accordance with an embodiment of the present invention.

FIG. 10C shows code in accordance with an embodiment of the present invention.

FIG. 11 shows pseudo-code for removing degenerative loops in accordance with an embodiment of the present invention.

FIG. 12 shows code in accordance with an embodiment of the present invention.

FIG. 13 shows code in accordance with an embodiment of the present invention.

FIG. 14 shows code in accordance with an embodiment of the present invention.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in direct contact (physically, electrically, magnetically, optically, etc.). "Coupled" may also mean two or more elements are not in direct contact with each other, but still cooperate or interact with each other.

Embodiments of the invention split the computation space in order to optimize code for multiprocessors. As multiprocessors become more prevalent, software needs to be compiled to run efficiently on multiprocessor systems. However, the parallelized code may run slower on a uniprocessor than the original sequential version. Embodiments herein split the computation space to simplify and speed up the parallelized code.

Figure 1:
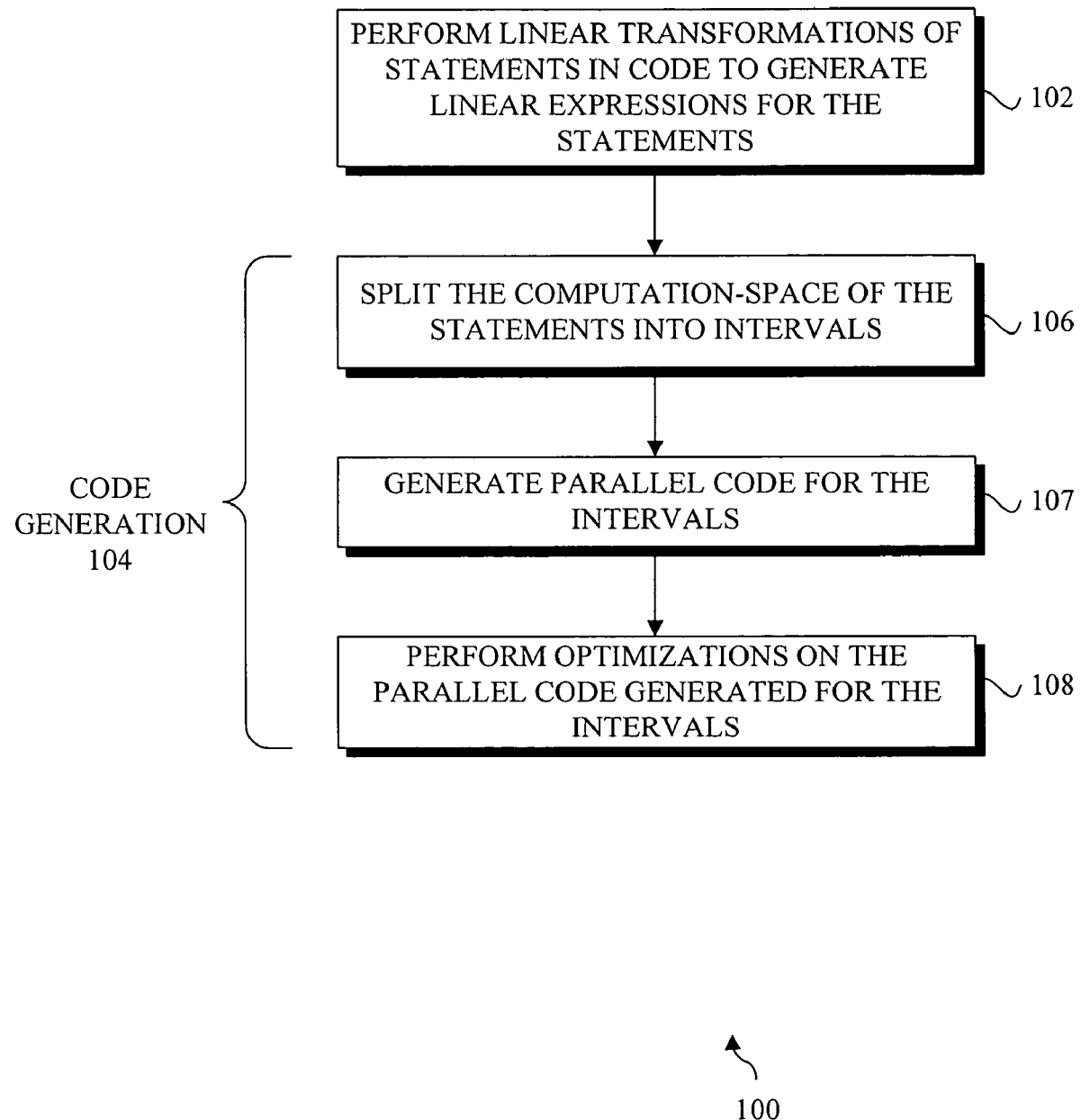
FIG. 1 is a flowchart illustrating the logic and operations of splitting the computation space in accordance with an embodiment of the present invention.

Turning to FIG. 1, a flowchart 100 in accordance with an embodiment of the invention is shown. In one embodiment, the logic and operations of flowchart 100 may be part of a parallelizing compiler. In another embodiment, flowchart 100 may be implemented as computer-accessible instructions executable by a computer system.

Starting in a block 102, linear transformations of statements of code is performed to generate linear expressions. In one embodiment, affine partitioning (linear transformation) is performed on code, such as source code, to generate affine partition mappings (linear expressions). The code may include sequential code or non-optimized parallel code.

After block 102, the logic proceeds to code generation, as shown at 104. In one embodiment, the code generated includes Single Program Multiple Data (SPMD) code. In SPMD code, processes execute the same code but use different data. Hence, SPMD code is often used for parallel code because the processes may be partitioned to multiple processors for independent execution.

The generated code may be used for analysis and debugging by programmers of the inserted code. The generated code may also be used by compiler writes to analyze the performance of the code generation scheme. In one embodiment, the generated code may be referred to as intermediate code. The intermediate code may be further compiled into object code for a targeted multiprocessor computer system.

Code generation 104 includes splitting the computation-space of the statements into intervals, as shown in a block 106. Splitting the computation-space involves taking statements (e.g., operations) that belong to the same space partition and separating the statements into intervals in the space partition. This splitting may expose events in the code that is ripe for optimization.

After splitting the computation-space, the logic may continue to a block 107 to generate code for the intervals. The logic continues to a block 108 to perform optimizations on the code generated for each interval. Such optimizations may include removing degenerative loops from an interval or removing dead code from an interval. Dead code includes guards that fail to provide any branching.

Affine Partitioning

In parallelizing compilers, the compiler may re-organize the computations so that each processor (or core) may re-use data efficiently. This reduces the working set on each processor, and thus, minimizes capacity misses. The re-organization also minimizes sharing misses because of reduced interprocessor communication. To optimize data re-use, a compiler may use a technique called affine partitioning.

In affine partitioning, an iterative instance is identified by the value of the loop indices in enclosed loops. An affine partitioning scheme consists of mappings, one for each operation in the program, from the original index variables to values of index variables in the transformed code. Operations with common enclosing loops share the same loop index variables. Operations described herein include statements.

The affine partitioning may find two types of affine partitions: space partitions and time partitions. Space partitioning places operations belonging to different independent threads in different space partitions. Operations belonging to the same space partition are mapped to the same processor (or core). If a program does not have any independent threads, the computations are divided into time partitions such that completing the partitions in order will satisfy the data dependencies. Embodiments of code generation described herein operate on affine space-partitioning mappings. The term "partition" herein refers to a space-partition.

To illustrate an embodiment of affine partitioning, the copy-transpose stencil code of FIG. 2A will be discussed. However, it will be understood that embodiments of code generation of the invention are not limited to copy-transpose computations.

Figures 2A, 2B, 3:
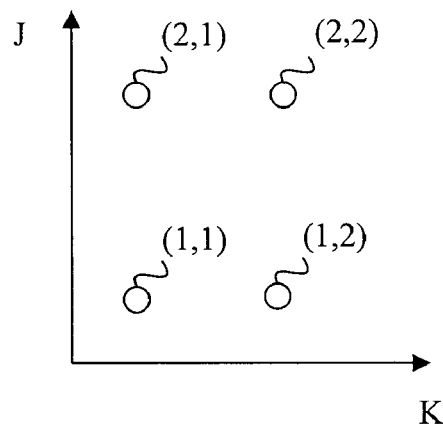
FIG. 2A shows copy-and-transpose code in accordance with an embodiment of the present invention.
FIG. 2B shows an array in accordance with an embodiment of the present invention.
FIG. 3 shows affine expressions in accordance with an embodiment of the present invention.

In FIG. 2A, statement S1 is a copy statement using array A and array B, and statement S2 is a transpose statement using array C and array A. An array for statements S1 and S2 where n=2 is shown in FIG. 2B.

The affine-partitioning framework computes the mappings for statements S1 and S2, respectively. One-dimensional processor space is assumed.

Affine partitioning produces mappings that may take the form of affine expressions (also referred to as affine functions). A linear transformation of induction variables is applied to each statement S1 and S2. The resulting affine expression represents a vector of constants and nodes in an array, respectively. The goal of the linear transformation is to find a common outermost parallel loop of all the statements.

Each statement has a different transformation, and each parallel transformation may be dispatched to a different processor (or core) of a multiprocessor system. The partitions are setup so that processors executing operations in different partitions need not synchronize with each other.

Space partitioning is performed after the linear transformation to separate code into several partitions as well as making sure there is no loop-carried dependence at the outermost loop. In previous schemes, the partitions may be assigned to different processors for parallelization. In accordance with embodiments herein, the partitions (also referred to as computation spaces) may be split into intervals. The intervals may correspond to portions or instances of a statement. Then, the intervals may be assigned to different processors for improved parallelization. Additional code optimizations may be applied to the intervals to further improve the performance.

The affine partition mappings of S1 and S2 are shown in FIG. 3 as Affine Expression (AE) 1 and AE2. For the computation of S1, a location (J,K) computes to J, and for S2, a location (J,K) computes to K. For example, in FIG. 2B, at array position (1,2), the solution to S1 is 1. For array position (1,2), the solution to statement S2 is 2.

AE1 and AE2 partition the statements S1 and S2 perpendicularly, which successfully co-locates all the accesses A[J, K] and A[K,J] in S1 and S2 of a given memory location into the same partition. Assuming the arrays are stored row-major, as in the 'C' language, these mappings yield better locality because the affine-partitioned code will traverse both array A and B in row-major and only array C in column-major.

Splitting the Computation Space

To parallelize the program in FIG. 2A with optimal locality and granularity of threads, all the accesses to A[J,K] and A[K,J] in S1 and S2 may be co-located in a given memory location and made by the same processor. Without loss of generality, one-dimensional processor space is assumed herein.

Parallelized code is shown in FIG. 4. P represents a partition that may be assigned to a single processor (or core). Note that P can be viewed as the virtual processor number. The processor space is partitioned and the loop P is parallel. Also note that statement S3 is guarded by expression E3, and statement S4 is guarded by expression E4. In one embodiment, a guard includes an expression, such as an if-then statement.

Assuming the arrays are stored row-major such as in the 'C' language, the parallelized program in FIG. 4 yields good locality because the code will traverse both arrays A and B in row-major and only array C in column-major.

Furthermore, all the accesses to A[J,K] and A[K,J] in S1 and S2 are co-located in a given memory location all the accesses are associated with the same processor. However, the parallelized program of FIG. 4 runs slower on a uniprocessor than the original sequential version of FIG. 2A.

Removing degenerate loops will not speed up the code in FIG. 4. A loop is degenerate if any statement in the loop is executed at most once. Loop K in FIG. 4 cannot be removed because loop K is degenerate with respect to S4, but not to S3. Thus, K cannot be replaced by P for S3 because K is not present in expression E3 guarding statement S3. Similarly, J is not present in expression E4 guarding S4.

To speed up a program for multiprocessors, embodiments herein perform computation-space splitting. Computation-space splitting may be performed on FIG. 4 by replacing J by P for the copy statement S3 and replacing K by P for the transpose statement S4. The values of J are partitioned into three intervals according to the affine expression for the copy statement S3.

Thus, three intervals, 501, 502 and 503, are generated as shown in FIG. 5. Analyzing different intervals allows events to more readily appear that may be removed for further optimizations. Embodiments of such optimizations include removing degenerative loops and removing dead code (discussed below in conjunction with FIGS. 11-14).

Figure 6:
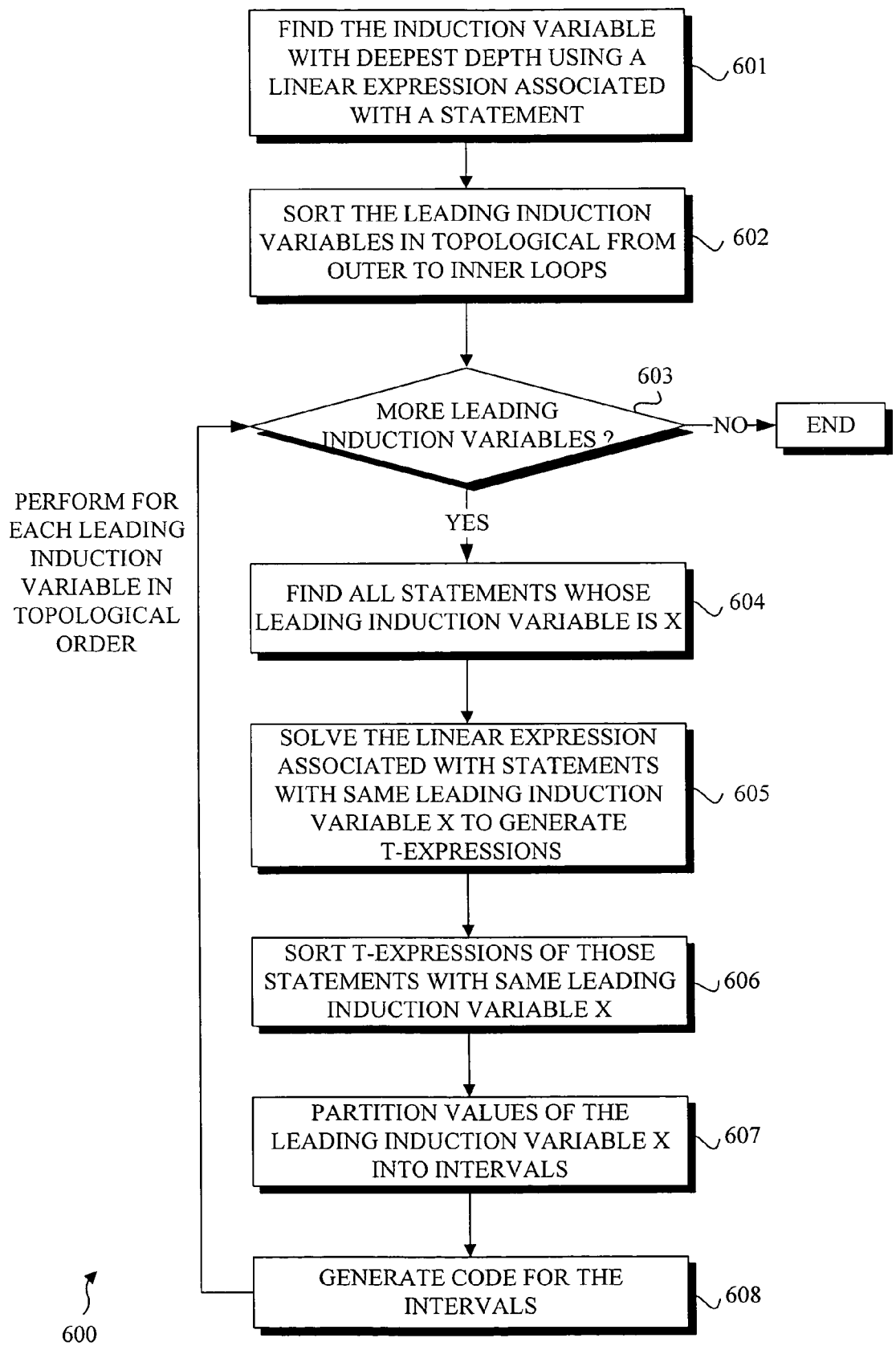
FIG. 6 is a flowchart illustrating the logic and operations of splitting the computation space in accordance with an embodiment of the present invention.

Turning to FIG. 6, a flowchart 600 for splitting the computation space in accordance with an embodiment of the invention is shown. The following discussion presents embodiments of the invention in relation to examples shown in FIGS. 7-10 as well as provides generalized algorithms.

Embodiments herein use a linear expression of loop induction variables for each statement inside a loop. In one embodiment, the linear expression may be obtained by performing affine partitioning of the code (discussed above). This linear expression allows for mapping a statement instance to a particular processor. As described below, a statement instance is associated with an interval that may be further optimized. An induction variable includes a variable that may be incremented or decremented the same amount for each loop iteration.

Embodiments herein generate a new outermost loop according to those linear expressions so that iterations of the outermost loop may be fully parallelized. An embodiment of linear transformation to generate linear expressions is affine partitioning. FIG. 7 shows example code at 702 and linear expressions associated with each statement (statements S1, S2, S3) at 704.

Linear transformation, such as affine partitioning, may be used to find such linear expressions so that computations of statements S1, S2, S3 with different partitions (Ps) may be executed independently. To be executed independently, statements dependent on each other must have the same P value. Embodiments herein partition the statements into intervals so that instances of statements corresponding to different P may be partitioned to different processors (or cores). Further, embodiments herein may perform optimizations of each interval to speed up execution of each interval.

In general terms, a total of K statements are represented in the following notation $s_1, s_2, \ldots, s_K$. The induction variables of all loops that $s_i$ is located in are $I_{i,1}, I_{i,2}, \ldots, I_{i,t(i)}$ respectively, where $I_{i,1}$ is the induction variable of the outermost loop and $I_{i,t(i)}$ is the induction variable of the innermost loop and t(i) is the number of loops that statement $s_i$ is located in.

Assuming the affine expression for $s_i$ is:

$$\phi_i(I_{i,1}, I_{i,2}, \ldots, I_{i,t(i)}) = u_{i,0} + u_{i,1} \times I_{i,1} + u_{i,2} \times I_{i,2} + \ldots + u_{i,t(i)} \times I_{i,t(i)},$$

the following logic selects a loop index for each statement.

Starting in a block 601 of FIG. 6, for each statement, use the linear expression associated with the statement to find the induction variable with the deepest depth. The induction variable with the deepest depth may be referred to as the leading induction variable of the linear expression (and accordingly, the leading induction variable of the statement). Block 601 may be expressed generally as: for each statement $s_i$, find the 1st non-zero element from list $u_{i,t(i)}, u_{i,t(i)-1}, \ldots, u_{i,2}, u_{i,1}$: $u_{i,r(i)}$ (where $1 \leq r(i) \leq t(i)$).

In FIG. 7, the leading induction variable of statement S1 is J1 since J1's depth is deeper than I. The leading induction variable of statement S2 is I since only induction variable I appears in the linear transformation expression. The leading induction variable of statement S3 is J2.

Continuing to a block 602, the leading inductions variables are sorted in topological order from outer to inner loops. In general terms for block 602, the topological order is calculated as follows. Calculate the set of induction variables $SI = \{I_{i,r(i)} | 1 \leq i \leq K\}$ and sort them in topological order $I_1, I_2, \ldots, I_h$ from the smallest to the largest, so that for any two induction variables $I_u, I_v$, if the loop of $I_v$ is the inner loop of the loop of $I_u$, u will appear before v in the sorted list because u is at a smaller (i.e., higher) loop level. This means that the loops will be processed for removal from statements in the order from outer loops to inner loops (for each element from list $I_1, I_2, \ldots, I_h$).

Flowchart 600 continues to a decision block 603 to determine if any more leading induction variables are left to be processed. If the answer is no, then flowchart 600 ends. If the answer is yes, then the logic continues to a block 604.

Continuing to blocks 604-608, all leading induction variables are processed one by one, in topological order, from outer to inner loops. In FIG. 7, the leading induction variable I will be processed first since it is the outermost loop, and later the leading induction variables J1 and J2 will be processed. Variables J1 and J2 may by processed in any order because the for-loops of J1 and J2 are on the same loop level.

In a block 604, for each leading induction variable X, find all statements whose leading induction variable is X. For the example in FIG. 7, if the current leading induction variable is I, statement S2's leading induction variable is I, so the logic of block 604 finds only one statement S2.

Another example is shown in FIG. 8. FIG. 8 shows example code at 802 and linear expressions associated with each statement (statements S1, S2, S3) at 804. For the linear expression associated with S3 (P=−I+1), statements S2 and S3 will be found if the current leading induction variable is I since the leading induction variables of both statements S2 and S3 are I.

In general terms for block 604, for the current induction variable $I_k$, find the set of statement $S = \{s_i | I_{i,r(i)} = I_k\}$.

Continuing to a block 605, for all those statements with the same leading induction variable X, represent X as the linear combination of other induction variables and P by solving the linear expression associated with those statements. The result of solving the linear expression is called "T-expression of the statement" and T(S) is used to represent the result for statement S. For the example in FIG. 8 using leading induction variable I, the logic of block 605 determines that: I=P−1 for S2 and I=−P+1 for S3. So T(S2)=P−1 and T(S3)=−P+1.

In general terms for block 605, for each statement $s_i$ in set S, calculate the expression:

$$T_i = (P - u_{i,0} - u_{i,1} \times I_{i,1} - u_{i,2} I_{i,2} - \ldots - u_{i,r(i)-1} \times I_{i,r(i)-1}) / u_{i,r(i)}.$$

Continuing to a block 606, sort the T-expressions of those statements with the same leading induction variable X. The sorting may occur in runtime or compile time. For example, if T(S1)=P and T(S2)=P+1, then T(S1)<T(S2), so the T-expressions may be sorted at compile time. But if T(S1)=−P and T(S2)=P+1, then it cannot be determined at compile time which T-expression is greater. In this case, the order of T(S1) and T(S2) may not be determined in advance so the sorting is done at runtime.

Only when there are at least two statements with same leading induction variable (so that there is at least two T-expressions), is a sort those T-expressions actually needed. When there is only a single statement for a given leading induction variable, the T-expression does not need to be sorted since the length of the list to be sorted is one (there's only one T-expression in this case). As discussed further below, in real benchmark testing, most leading induction variables have only one T-expression.

For the example in FIG. 7 and leading induction variable I, only one statement S2 has I as the leading induction variable, so only a single T-expression T(S2) is solved. Thus, a sort is not necessary since there is only one T-expression.

For the example in FIG. 8 and leading induction variable I, T(S2) and T(S3) cannot be sorted at compile time because S2 and S3 have the same leading induction variable I. It may not be determined at compile time whether T(S2)<T(S3), T(S2)=T(S3) or T(S2)>T(S3), so they are sorted at runtime. Since T(S2) and T(S3) are sorted at runtime, code is generated for the possible intervals of the possible sort orders of T(S2) and T(S3) (discussed below).

Sorting those T-expressions at compile time will result in better runtime performance. But if those T-expressions cannot be sorted at compile time, they will be sorted at runtime. If there are many statements with the same leading induction variable, runtime sorting may reduce runtime performance so it should be avoided.

Fortunately, for most real applications, the number of statements with the same leading induction variable is not large. Thus, the ordering of most T-expressions may be determined at compile time because there is usually only a single statement for a given leading induction variable, and thus, only a single T-expression. In one embodiment, the transformation of a loop may be given up when it is found that there are many statements with the same leading induction variable and the ordering of those T-expressions correspondent to those statements may not be sorted at compile time and must be sorted at runtime.

In general terms for block 606, sort all $T_i$ for all i that $s_i$ is in S. As discussed above, for the given induction variable $I_x$, the number of statements whose induction variables are $I_x$ is usually small. In most cases, the formula of $T_i$ will be very simple for most statements so that the order of most $T_i$ may be sorted at compile time. The case where the ordering is determined at runtime is discussed below.

Continuing to a block 607, values of the leading induction variable X are partitioned (also referred to as split) into intervals using the sorted T-expression(s). Code may then be generated for the intervals independently.

Using the example in FIG. 8, when there are two T-expressions for the leading induction variable I, the T-expressions may have values as follows: T(S2)<T(S3), T(S2)=T(S3) or T(S2)>T(S3). Thus, code is generated for these possible values so that code is available no matter how the T-expressions are ordered at runtime. For example, i) when T(S2)<T(S3), the intervals may be:
 a) I<T(S2)
 b) I=T(S2)
 c) T(S2)<I<T(S3)
 d) I=T(S3)
 e) I>T(S3)
ii) When T(S2)=T(S3), the intervals may be:
 (f) I<T(S2),
 (g) I=T(S2)
 (h) T(S3)<I
iii) When T(S1)>T(S2), the intervals may be:
 (i) I<T(S3)
 (j) I=T(S3)
 (k) T(S3)<I<T(S2)
 (l) I=T(S2)
 (m) T(S2)<I Based on the above, code may be generated for 13 intervals. This may cause the code size to expand greatly. However, the number of code segments for the intervals may be reduced by identifying intervals that result in the same generated code. A single version of parallel code is generated for two or more intervals that result in the same code logic.

In the example above, the intervals (a), (c), (e), (f), (h), (i), (k), (m) will result in the same generated code. In these intervals, only statement S1 will be executed since S2 will only be executed when I=T(S2) and S3 will only be executed when I=T(S3). In other words, all statements but S2 and S3 will be executed. The generated code for intervals (a), (c), (e), (f), (h), (i), (k), (m) is shown in FIG. 9.

The intervals (b) and (l) generate the same code. Statements S1 and S2 will be executed. The code generated for intervals (b) and (l) is shown in FIG. 10.

The intervals (d) and (j) will generate the same code. Statements S1 and S3 will be executed. The code for intervals (d) and (j) is similar to that of FIG. 10.

And the interval (g) will use the original code since all statements (i.e., S1, S2 and S3) will be executed.

Thus, although there are 13 intervals, only four (4) different versions of code is needed, since there are really only four different interval situations. One of the versions is original code (interval (g)), so only 3 versions have to be generated. Thus, when there are many T-expressions associated with a single leading induction variable, instead of generating a different version of code for each interval in each situation, codes are generated for different situations in advance and the correspondent piece of code is selected in runtime according to the sorting result of the T-expressions.

In sum, when there are k statements sharing the same leading induction variable I, k+1 versions of code are generated in advance. One code version is where all statements whose leading induction variable is I is removed and the other k versions are the code with all but one statement whose leading induction variable is I is removed.

After the transformation (blocks 604-608) is finished, the same transformation may be applied to leading induction variable J1 of FIG. 8 to transform all instances of the innermost loop J1. This results in an equivalent optimized code and the computation space will be partitioned so that code correspondent to different P will be run in different processors (or cores).

For block 607 in general terms, if the order of all $T_i$ may be determined at compile time and they are not equal to each other, assuming $T_1<T_2<\ldots<T_p$, the original loop may be replaced by the code segments (i.e., intervals) shown in FIG. 10B. The code FIG. 10B may be used when the ordering of $T_p$ is known at compile time.

However, in some cases, the ordering of list $T_1, T_2, \ldots, T_p$ may not be able to be determined at compile time and is determined at runtime (such as described above in connection with block 606). In one embodiment, to solve this problem, the compiler may generate p+1 pieces of code C(i). Note that the last piece code C(p+1) is "the original loop body of the loop after removing statements in S" noted in the code of FIG. 10B, while the i-th piece code C(i) (for i≦p) is "the original loop body of the loop after removing statements in S−{$s_i$}" noted in FIG. 10B. The code shown in FIG. 10C may be used to sort list {$T_i$} at runtime.

The code size issue is described in general terms as follows with reference to FIGS. 10B and 10C. At runtime, the situation may occur where some $T_i$ are equal to each other. In such cases, a loop body is generated which is the original loop body of the loop after removing statements in S. However, all the statements corresponding to the same value $T_i$ should not be removed. When the variable p is very small (such as 2 or 3), it is not a problem, since codes may be generated for all those kinds of combination. But when p is relatively large, it is better to generate a piece of code which uses a bit vector to determine how many statements in S should be executed. Namely, one bit is used for each statement. Finally, when p is very small, the loop "For(i=0;i<p;i++)" may be fully unrolled. In the remaining cases where the order of many $T_i$ cannot be determined at compile time, parallelization in that computation space may not necessarily be performed. Parallelization may not be desirable because the overhead of the parallelization may be unacceptably high.

In flowchart 600, after block 607, the logic proceeds to a block 608 to generate the code for the intervals. In one embodiment, the versions of code for each interval may be outlined. In another embodiment, a GOTO table is generated so that each situation will run one of the above generated codes.

After the above logic (blocks 604-608) has been applied to one leading induction variable, the logic returns to decision block 603 to determine if there are any more leading induction variables for processing. The logic is repeated on the remaining leading induction variables, in topological order, until all are processed.

Optimization—Removing Degenerative Loops

In one embodiment, degenerative loop removal may be applied to the intervals to further optimize the code. Degenerative loop removal involves removing loops that execute at most once. Referring to FIG. 5, for intervals 501 and 503, degenerate loop removal may be applied. In interval 501, loop K is degenerate because statement S4 will never execute. The guard "if (P==K)" is never satisfied because P will never equal K because the K loop counts up to J which is less than P.

In interval 503, loop K is degenerate because the guard "if (P==K)" will be satisfied at most once, so statement S4 will be executed at most once.

It will be noted that loop K in interval 502 is not degenerate. Statement S3 will be executed J times because of the guard "if (P==J)." However, statement S4 will be executed at most once because guard "if (P==K)" will only execute once when the K loop counts to J which is equal to P. FIG. 12 shows the resulting code after degenerative loop removal of loop K.

An embodiment of degenerative loop removal is shown by the pseudo-code of FIG. 11. FIG. 11 will be discussed in relation to interval 501 of FIG. 5, but one skilled in the art having the benefit of this disclosure will appreciate how the pseudo-code of FIG. 11 may be implemented in general.

In FIG. 11, the pseudo-code begins on line 1102, where for each statement S, for each loop level J for S (line 1104) the logic determines if S is degenerate with respect to the loop level J (line 1106).

Proceeding to line 1108 of FIG. 11, the logic solves the expression guarding S for J and assigns the solution to J'. In interval 501 of FIG. 5, loop K can be eliminated by solving the expression "if (P==K)" that guards statement S4.

Proceeding to line 1112 in FIG. 11, the expression previously guarding S is added on J' to honor the bounds of degenerate loop J. The code after applying degenerate loop removal is shown in FIG. 12 as intervals 1201, 1202, and 1203. Note that the guard "if ($1 \leq P \leq J$)" is inserted in interval 1201 because the boundary conditions of the loop K for statement S4 need to be maintained.

Optimization—Removing Dead Code

Further optimizations may be made by removing dead code, such as dead guards. Referring to FIG. 12, in case 1201, the expression "$1 \leq P \leq J$" is never satisfied because interval 1201 pertains to the case when "J<P." Thus, interval 1201 may be removed.

Removing dead code may also include merging intervals. In FIG. 12, an optimization may be made by merging the two remaining cases, case 1202 and 1203. The resulting code is shown in FIG. 13.

Removing guards that are always true or false, that is dead guards, may further improve performance. For instance, guards "P==P" and "$1 \leq P \leq J$" are always true in the code shown in FIG. 13, so these guards may be removed. The resulting code is shown in FIG. 14.

It will be noted that the code in FIG. 14 is more efficient than the code in FIG. 4 since FIG. 14 has 2 loop levels instead of 3 loop levels. The code of FIG. 14 will run faster than the code of FIG. 4 due to the fewer loop levels.

Embodiments of the invention provide a method to systematically optimize parallelize code for multiprocessor systems by splitting the computation space. Embodiments herein generate parallelized code that may run on a uniprocessor at a similar speed as the original sequential version.

Embodiment of a Computer System

Figure 15:
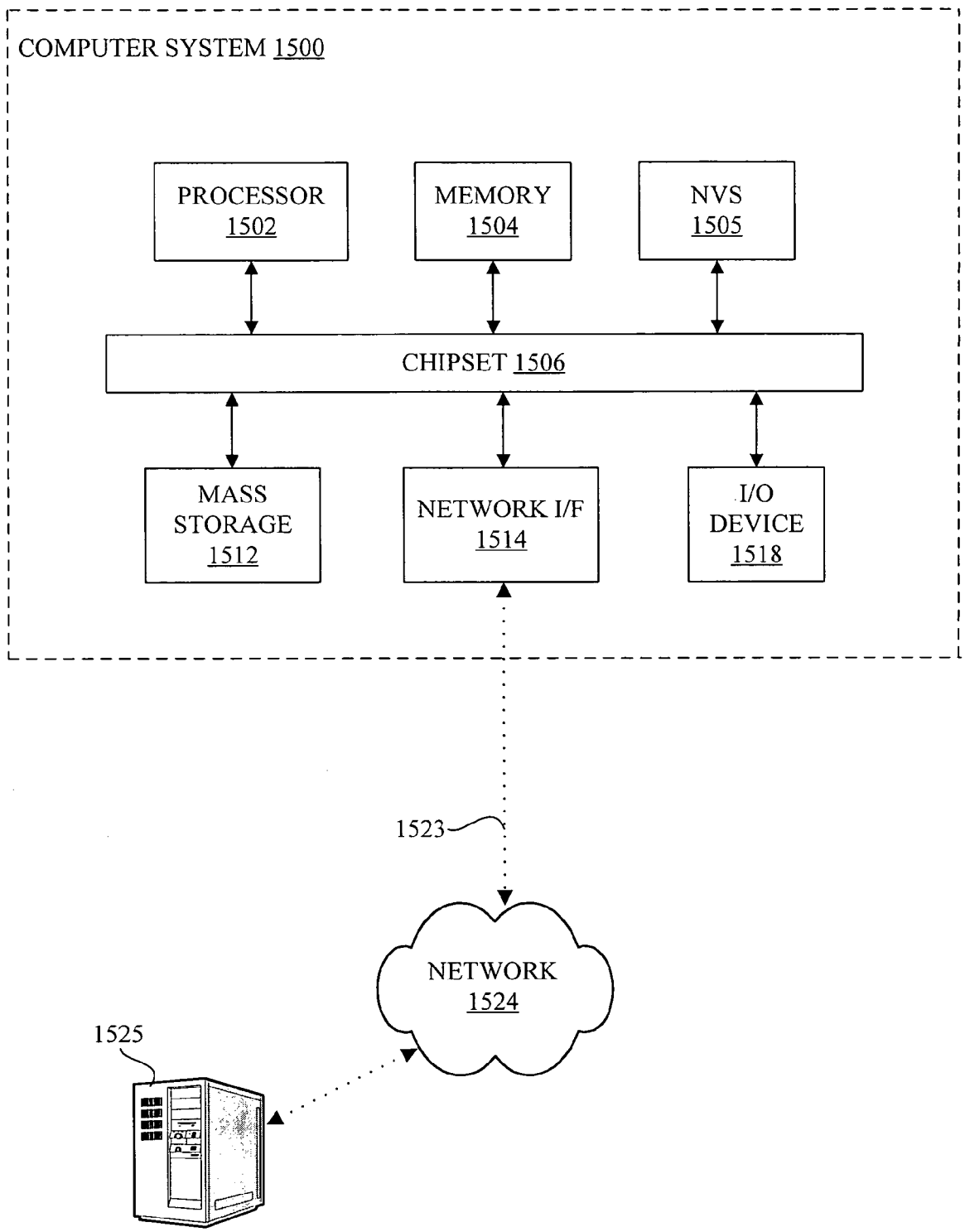
FIG. 15 is a diagram illustrating one embodiment of a computer system to implement embodiments of the present invention.

FIG. 15 is an illustration of one embodiment of a computer system 1500 on which embodiments of the present invention may be implemented. In one embodiment, computer system 1500 may execute instructions for a parallelizing complier performing code generation in accordance with embodiments herein.

Computer system 1500 includes a processor 1502 and a memory 1504 coupled to a chipset 1506. Mass storage 1512, Non-Volatile Storage (NVS) 1505, network interface (I/F) 1514, and Input/Output (I/O) device 1518 may also be coupled to chipset 1506. Embodiments of computer system 1500 include, but are not limited to, a desktop computer, a notebook computer, a server, a personal digital assistant, a network workstation, or the like. In one embodiment, computer system 1500 includes processor 1502 coupled to memory 1504, processor 1502 to execute instructions stored in memory 1504.

Processor 1502 may include, but is not limited to, an Intel® Corporation x86, Pentium®, Xeon®, or Itanium® family processor, or the like. In one embodiment, computer system 1500 may include multiple processors. In another embodiment, processor 1502 may include two or more processor cores.

Memory 1504 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, memory 1504 may include one or more memory units that do not have to be refreshed.

Chipset 1506 may include a memory controller, such as a Memory Controller Hub (MCH), an input/output controller, such as an Input/Output Controller Hub (ICH), or the like. In an alternative embodiment, a memory controller for memory 1504 may reside in the same chip as processor 1502. Chipset 1506 may also include system clock support, power management support, audio support, graphics support, or the like. In one embodiment, chipset 1506 is coupled to a board that includes sockets for processor 1502 and memory 1504.

Components of computer system 1500 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 1518 may include a keyboard, a mouse, a display, a printer, a scanner, or the like.

Computer system 1500 may interface to external systems through network interface 1514. Network interface 1514 may include, but is not limited to, a modem, a Network Interface Card (NIC), or other interfaces for coupling a computer system to other computer systems. A carrier wave signal 1523 may be received/transmitted by network interface 1514. In the embodiment illustrated in FIG. 15, carrier wave signal 1523 is used to interface computer system 1500 with a network 1524, such as a Local Area Network (LAN), a Wide Area Network (WAN), the Internet, or any combination thereof. In one embodiment, network 1524 is further coupled to a computer system 1525 such that computer system 1500 and computer system 1525 may communicate over network 1524.

Computer system 1500 also includes non-volatile storage 1505 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Mass storage 1512 includes, but is not limited to, a magnetic disk drive, a magnetic tape drive, an optical disk drive, or the like. It is appreciated that instructions executable by processor 1502 may reside in mass storage 1512, memory 1504, non-volatile storage 1505, or may be transmitted or received via network interface 1514.

In one embodiment, computer system 1500 may execute an Operating System (OS). Embodiments of an OS include Microsoft Windows®, the Apple Macintosh operating system, the Linux operating system, the Unix operating system, or the like.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., Read-Only Memory (ROM), Random Access Memory (RAM), magnetic disk storage media, optical storage media, a flash memory device, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-accessible medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
performing, via a processor, linear transformations of statements in code to generate linear expressions associated with the statements in code, wherein the statements in code are included in a plurality of outer-to-inner loops and comprise a computation-space; and
generating, via the processor, parallel code using the linear expressions, wherein generating the parallel code includes
splitting the computation-space of the statements in code into intervals using the linear expressions, wherein splitting the computation-space of the statements into intervals includes
finding a leading induction variable for each of the statements, the leading induction variable comprising the induction variable for the statement with deepest depth,
sorting the leading induction variables for each of the statements in topological order from outer-to-inner loops, and
for each sorted leading induction variable,
solving each linear expression associated with a statement that includes the sorted leading induction variable to generate one or more corresponding T-expressions, wherein the one or more T-expressions represent a solution of said linear expression,
sorting the one or more T-expressions, and
partitioning values of the sorted leading induction variable into intervals using the sorted one or more T-expressions, and
generating parallel code for the intervals, each interval to be assigned to a processor core.

2. The method of claim 1 wherein performing linear transformations of the statements in code to generate linear expressions includes performing affine partitioning of the statements in code to generate affine mappings of the statements in code, wherein the affine mappings serve as the linear expressions.

3. The method of claim 1 wherein the one or more T-expressions are sorted at runtime.

4. The method of claim 1 wherein a single version of parallel code is generated for two or more intervals that would result in the same code logic.

5. The method of claim 1, further comprising performing optimizations on the parallel code.

6. The method of claim 5 wherein performing optimizations includes at least one of removing degenerative loops or removing dead code.

7. An article of manufacture, comprising a machine-accessible medium including instructions that, if executed by a machine, will cause the machine to perform operations comprising:
performing linear transformations of statements in code to generate linear expressions associated with the statements in code, wherein the statements in code are included in a plurality of outer-to-inner loops and comprise a computation-space; and generating parallel code using the linear expressions, wherein generating the parallel code includes splitting the computation-space of the statements in code into intervals using the linear expressions, wherein splitting the computation-space of the statements includes finding a leading induction variable for each of the statements, the leading induction variable comprising the induction variable for the statement with deepest depth, sorting the leading induction variables for each of the statements in topological order from outer-to-inner loops, and for each sorted leading induction variable, solving each linear expression associated with a statement that includes the sorted leading induction variable to generate one or more corresponding T-expressions, wherein the one or more T-expressions represent a solution of said linear expression, sorting the one or more T-expressions, and partitioning values of the sorted leading induction variable into intervals using the sorted one or more T-expressions, and generating parallel code for the intervals, each interval to be assigned to a processor core; and performing optimizations on the parallel code.

8. The article of manufacture of claim 7, wherein the T-expressions are sorted at runtime.

9. The article of manufacture of claim 7, wherein a single version of parallel code is generated for two or more intervals that would result in the same code logic.

10. The article of manufacture of claim 7 wherein performing optimizations includes removing a degenerative loop from the parallel code, wherein the degenerative loop includes a loop that executes at most once.

11. The article of manufacture of claim 7 wherein performing optimizations includes removing dead code from the parallel code.

12. The article of manufacture of claim 7 wherein the instructions are pan of a parallelizing compiler.

13. A computer system, comprising:

a processor;

a Dynamic Random Access Memory (DRAM) coupled to the processor; and a storage unit coupled to the processor, wherein the storage unit including instructions which when loaded into the DRAM and executed by the processor perform operations comprising:

performing linear transformations of statements in code to generate linear expressions associated with the statements in code, wherein the statements in code are included in a plurality of outer-to-inner loops and comprise a computation-space; and generating parallel code using the linear expressions, wherein generating the parallel code includes splitting the computation-space of the statements in code into intervals using the linear expressions, wherein splitting the computation-space of the statements includes finding a leading induction variable for each of the statements, the leading induction variable comprising the induction variable for the statement with deepest depth, sorting the leading induction variables for each of the statements in topological order from outer-to-inner loops, and for each sorted leading induction variable, solving each linear expression associated with a statement that includes the sorted leading induction variable to generate one or more corresponding T-expressions, wherein the one or more T-expressions represent a solution of said linear expression, sorting the one or more T-expressions, and partitioning values of the sorted leading induction variable into intervals using the sorted one or more T-expressions, and generating parallel code for the intervals, each interval to be assigned to a processor core; and performing optimizations on the parallel code.

14. The computer system of claim 13 wherein performing optimizations includes at least one of removing degenerative loops from the parallel code or removing dead code from the parallel code.

* * * * *

UNITED STATES PATENT AND TRADEMARK OFFICE
CERTIFICATE OF CORRECTION

| | | |
|---|---|---|
| PATENT NO. | : 7,689,980 B2 | |
| APPLICATION NO. | : 11/241396 | |
| DATED | : March 30, 2010 | |
| INVENTOR(S) | : Du et al. | |

It is certified that error appears in the above-identified patent and that said Letters Patent is hereby corrected as shown below:

In column 13, at line 45 delete, "pan" and insert --part--.

Signed and Sealed this
Twenty-fifth Day of January, 2011

David J. Kappos
*Director of the United States Patent and Trademark Office*